(12) United States Patent
Peden et al.

(10) Patent No.: US 8,380,504 B1
(45) Date of Patent: Feb. 19, 2013

(54) GENERATION OF VOICE PROFILES

(75) Inventors: Mark Douglas Peden, Olathe, KS (US); Simon Youngs, Overland Park, KS (US); Gary Duane Koller, Overland Park, KS (US); Piyush Jethwa, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 233 days.

(21) Appl. No.: 12/775,270

(22) Filed: May 6, 2010

(51) Int. Cl.
*G10L 17/00* (2006.01)
*G10L 15/00* (2006.01)
*G10L 11/00* (2006.01)

(52) U.S. Cl. .................. 704/246; 704/231; 704/200

(58) Field of Classification Search .................. 704/246, 704/247, 249, 250, 233, 270.1
See application file for complete search history.

(56) References Cited

U.S. PATENT DOCUMENTS

| | | | |
|---|---|---|---|
| 5,865,626 A * | 2/1999 | Beattie et al. ................. | 434/185 |
| 6,343,270 B1 * | 1/2002 | Bahl et al. ..................... | 704/257 |
| 6,711,542 B2 * | 3/2004 | Theimer ........................ | 704/257 |
| 7,082,392 B1 * | 7/2006 | Butler et al. ................... | 704/233 |
| 7,225,125 B2 * | 5/2007 | Bennett et al. ................. | 704/233 |
| 7,330,890 B1 * | 2/2008 | Partovi et al. ................. | 709/224 |
| 7,496,511 B2 * | 2/2009 | Vora .............................. | 704/246 |
| 7,831,420 B2 * | 11/2010 | Sinder et al. .................. | 704/225 |
| 7,844,045 B2 * | 11/2010 | Contolini et al. ......... | 379/265.12 |
| 7,894,596 B2 * | 2/2011 | Moore et al. ............. | 379/265.12 |
| 8,073,693 B2 * | 12/2011 | Ljolje et al. ................... | 704/254 |
| 2007/0036297 A1 * | 2/2007 | Miranda-Knapp et al. ........................ | 379/88.19 |
| 2009/0232296 A1 * | 9/2009 | Jaiswal et al. ........... | 379/265.12 |
| 2010/0161337 A1 * | 6/2010 | Pulz et al. ..................... | 704/257 |

* cited by examiner

*Primary Examiner* — Jesse Pullias

(57) ABSTRACT

Embodiments of the present invention provide systems, methods, and computer-readable media for generating a voice characteristic profile based on detected sound components. In embodiments, a call is initiated between a first caller and a second caller. Information communicated during the call is monitored to determine that sound components have been spoken by the first caller. The sound components are determined to be associated with a language dialect. Further, the sound components are stored in association with the first caller. In particular, the sound components are stored in association with the first caller in a voice characteristic profile of the first caller.

12 Claims, 9 Drawing Sheets

GENERATION OF VOICE PROFILES

SUMMARY

Embodiments of the invention are defined by the claims below, not this summary. A high-level overview of various aspects of the invention are provided here for that reason, to provide an overview of the disclosure, and to introduce a selection of concepts that are further described below in the Detailed Description section. This summary is not intended to identify key features of the claimed subject matter, nor is it intended to be used as an aid in isolation to determine the scope of the claimed subject matter.

Speech recognition software has become increasingly used in customer service applications. However, it is difficult to design speech recognition software to be generally applicable across a broad range of accents, dialects, or both. In order to increase the effectiveness of speech recognition software, a voice recognition system may be provided with information associated with the dialect of a user. By determining and providing user-specific information to voice recognition systems, speech recognition software may be designed to be more efficient in the analysis of the user's speech.

In a first aspect, a set of computer-usable instructions provide a method of generating voice characteristic profiles. The method includes receiving information communicated during a call. The information communicated during the call is analyzed, and a set of sound components is identified from the information communicated during the call. In particular, a set of sound components originating from a first caller is identified from the information communicated during the call. Further, a subset of the set of sound components is matched with a threshold number of pre-defined dialect sound components. Based on matching the subset of the set of sound components with the threshold number of pre-defined dialect sound components, a first dialect is determined. Additionally, a voice characteristic profile comprising the first dialect is generated. In particular, a voice characteristic profile of the first caller is generated.

In a second aspect, a method of generating voice characteristic profiles of callers is provided. The method includes receiving information communicated between a first caller and a second caller during a call. The information may be received at a computing device. The method also includes analyzing the information communicated during the call. Further, a set of sound components that originate from the first caller are identified. Additionally, a subset of the set of sound components are matched with pre-defined sound components associated with characteristics. Based on matching the subset of the set of sound components with the pre-defined sound components, a first characteristic is determined. A first voice characteristic profile that is associated with the first caller is then generated. Further, the first voice characteristic profile includes the first characteristic.

In a third aspect, a set of computer-usable instructions provide a method of modifying information communicated during a call based on voice characteristic profiles. The method includes receiving information communicated during a call between a first caller and a second caller, the information spoken by the second caller. The information may be received at a voice processing component on a computing device. The method further includes retrieving a voice characteristic profile associated with the first caller. The voice characteristic profile includes a first characteristic associated with the first caller. Additionally, a set of keywords associated with the first characteristic is determined. Further, the information spoken by the second caller is modified based on the first characteristic and the set of keywords. Additionally, the modified information is communicated to the first caller.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
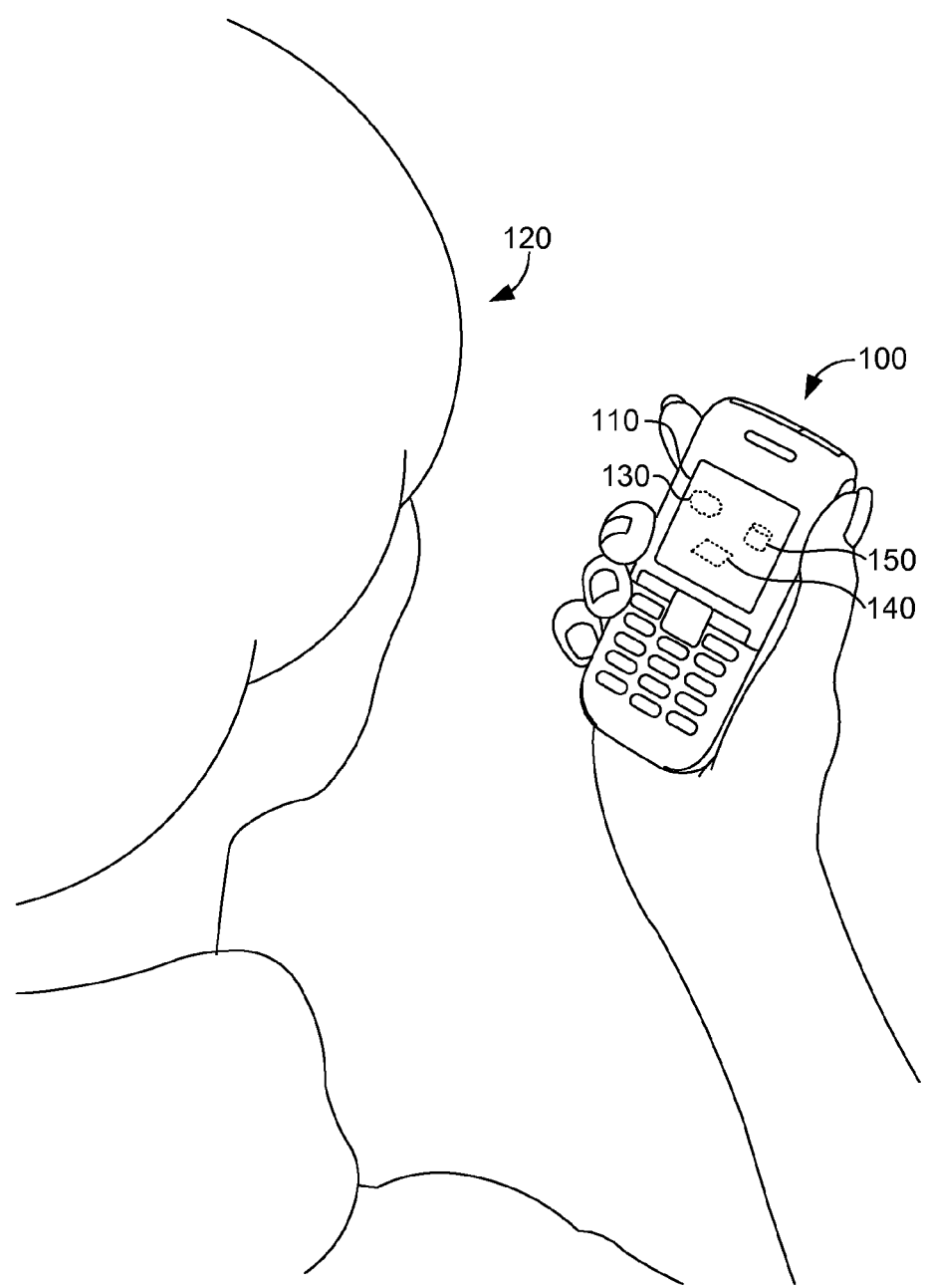
FIG. 1 is a schematic diagram of an illustrative mobile device, in accordance with an embodiment of the present invention.

The subject matter of embodiments of the present invention is described with specificity herein to meet statutory requirements. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| CD-ROM | Compact Disk Read Only Memory |
| DVD | Digital Versatile Discs |
| EEPROM | Electrically Erasable Programmable Read Only Memory |

| | |
|---|---|
| LAN | Local Area Network |
| MP3 | MPEG-1 Audio Layer 3 |
| PC | Personal Computer |
| PDA | Personal Digital Assistant |
| RAM | Random Access Memory |
| ROM | Read Only Memory |
| WAN | Wide Area Network |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media include media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the present invention provide systems, methods, and computer-readable media for generating voice profiles for users based on information communicated during calls. In particular, embodiments of the present invention provide systems and methods of generating a voice profile comprising characteristics of a user based on sound components communicated during a call. For example, a characteristic may include a language dialect; a demographic attribute, such as age or gender of a user; a background noise characteristic; or a dialect preference.

In embodiments, a first caller may initiate a call to a second caller. In order to determine a dialect for the first caller, the information communicated from the first caller may be analyzed to determine particular sound components used by the first caller. Sound components are defined based on the frequency and time duration of sound waves generated by callers who are speaking. Additionally, sound components may be further defined based on the amplitude and variance of frequency of sound waves. A word spoken by a caller, such as the first caller, may comprise one or more sound components. The sound components used by the first caller may then be assessed against sound components associated with particular dialects. For example, dialect sound components may be defined by sound components of words that are commonly used in a dialect.

Additionally, dialect sound components may be stored in association with a word bank of words commonly used in the dialect. Based on the comparisons, a characteristic dialect of the first caller may be determined. Further, the determined characteristic dialect may be saved in association with the first caller. For example, the determined characteristic may be saved in a voice characteristic profile of the first caller. A voice characteristic profile may include characteristics associated with a caller, such as the first caller. For instance, the voice characteristic profile of the first caller may include a characteristic dialect and characteristic accent associated with the first caller. The voice characteristic profile of the first caller may also include a word bank of words that are associated with the characteristic dialect, characteristic accent, or both. Additionally, the determined characteristics associated with the first caller may be provided to a voice recognition system in order to increase the accuracy of a voice recognition process.

A sound component monitoring service may be used to monitor sound components communicated during a call. In particular, the sound component monitoring service analyzes information communicated between callers to determine whether particular sound components have been spoken during a call. The sound components that are selected to be monitored may be based on sound components that are associated with particular voice characteristics, such as dialects. In embodiments, the sound components selected to be monitored may include keywords that are associated with a particular dialect. For example, the keyword "eh" may be monitored by the sound component monitoring device. Further, the detection of the keyword "eh" may help to indicate a caller is associated with Vancouver, Canada. In particular, dialects associated with detected sound components may be determined at a characteristic recognition component. The characteristic recognition component receives the sound components detected during a call and determines whether the sound components from the call match a threshold number of sound components associated with characteristics.

For example, the sound components detected during the call may be assessed against sound components associated with a Vancouver dialect. Upon determining the sound components detected during the call match a threshold number of sound components associated with the Vancouver dialect, the Vancouver dialect may be associated with the caller. Additionally, the sound components detected during the call may be received at the characteristic recognition component from the sound component monitoring service. Accordingly, in response to a determination of a Vancouver dialect associated with the caller, Canadian phrases may be given interpretive priority by a voice recognition system so as to increase the effectiveness of the voice recognition system. For example, a collection of sound components that phonetically sound like "snew" may be preferentially interpreted as "snow" if the caller is determined to have a Canadian accent. In contrast, the collection of sound components that phonetically sound like "snew" may be interpreted as "stew" if the caller is determined to have a generic accent.

Further, a user may have more than one dialect associated with the user. For example, a user who has lived in Vancouver, Canada and Brooklyn, New York may have aspects of each geographic dialect in his speech patterns. As such, a user profile associated with the user may give interpretive priority to Canadian and New York dialects in a voice recognition system. Additionally, based on the number of sound components detected from the Canadian and New York dialects, each dialect may have a threshold amount of sound components to give interpretive priority to both dialects. However, in further embodiments, a first dialect that has a greater number of detected sound components than a second dialect may be given interpretive priority over that second dialect that has a lower number of detected sound components. As such, the user described above may have a primary dialect of Canada and a secondary dialect of New York. As such, phrases from both Canadian dialects and New York dialects may be given interpretive priority by a voice recognition system over generic words.

However, when there is a conflict between interpreting a word using a Canadian dialect and interpreting a word using a New York dialect, the Canadian dialect may be given interpretive priority. In particular, a voice recognition system that has a conflict between a Canadian interpretation of a word and a New York interpretation of a word may give interpretive priority to the Canadian interpretation of the word based on the greater number of Canadian dialect sound components of the information communicated during the call. In alternative embodiments, a user may elect to give interpretive priority to a particular dialect. For example, even if a first dialect (e.g., a Canadian dialect) has a greater number of sound components than a second dialect (e.g., a New York dialect), a user may choose to elect the second dialect (i.e., the New York dialect) in spite of the lesser number of detected sound components associated with the second dialect.

As discussed above, sound components may be used to determine profile characteristics of a user. Further, sound components may include keywords. For example, the detection of keywords "$3^{rd}$ grade," "Huckleberry Finn," and "cumulous clouds" may indicate that the user is between the ages of ten and twelve years old. Additionally, the determination that a user is a pre-teenager may be provided to a voice recognition system. Based on the additional information, the voice recognition system may prioritize words that are more common to pre-teenagers than the general public, thus increasing the accuracy of voice recognition of the pre-teenage user.

Additionally, a set of keywords associated with a characteristic may be identified in response to a determination of the characteristic. For instance, in the example above, the determination that the user is a pre-teenager may be followed by an identification of keywords associated with pre-teenagers. In particular, a keyword database may be queried to determine a set of keywords associated with pre-teenagers. As discussed above, the set of keywords associated with pre-teenagers may be given interpretive priority over other, similar words. For instance, a set of keywords associated with pre-teenagers may include the top ten musical acts for that demographic group. Additionally, the set of keywords associated with pre-teenagers may be stored at a mobile device associated with the user. As such, the set of keywords may be provided to a voice recognition system along with a request to initiate contact with another mobile device. Alternatively, the set of keywords associated with pre-teenagers may be stored at a database. In particular, the set of keywords may be stored in association with the user at the database. As such, the set of keywords may be queried by the voice recognition system in response to determining that the user is a pre-teenager.

Once characteristics of a user are determined, the information communicated between users may be modified. For instance, if a first caller is determined to have a characteristic of a Southern accent, the information communicated from a second caller to the first caller may be modified to sound like the second caller has a Southern accent. Alternatively, if the first caller is determined to have a Southern accent, but has a personal preference of desiring to have a Canadian accent, the information communicated from first caller to the second caller may be modified to sound like the first caller has a Canadian accent. In further embodiments, information communicated between callers may also be modified to change the perceived age of a caller, to change the perceived gender of a caller, etc.

Turning now to FIG. 1, a schematic diagram of an illustrative mobile device is provided in accordance with an embodiment of the present invention and referenced by the numeral 100. For brevity or as a shorthand form, this description might refer to a "device" instead of a "mobile device." This shorthand does not mean to imply a distinction with the different terms. In addition, a mobile device may refer to a number of different devices such as a cell phone or a PDA. This description does not intend to convey bright-line distinctions between the different types of mobile devices. Indeed, what one might refer to as a PDA, another might refer to as a mobile device or cell phone or even a PC.

Mobile device 100 may include a user interface 110, user 120, application 130, memory 140, and data structure 150. Generally, user interface 110 provides an input/output (I/O) interface that user 120 may engage to interact with device 100. For example, user interface 110 may include a touch screen that a user may scratch or touch to interact with device 100. This interaction may include selecting an image to display in the background of the user interface 110.

The mobile device 100 can be any computing device. In embodiments, mobile device 100 may be capable of web accessibility. Device 100 might take on a variety of forms, such as a personal computer (PC), a laptop computer, a mobile phone, a personal digital assistance (PDA), a CD player, an MP3 player, a video player, a handheld communications device, a workstation, any combination of these devices, or any other mobile device, including a device that is capable of web accessibility. In one embodiment, device 100 is a mobile device that utilizes a wireless telecommunications network to communicate. Manufacturers of illustrative mobile devices include, for example, Research in Motion® of Waterloo, Canada; Creative Technologies Corp. of Brooklyn, N.Y.; Samsung® of Seoul, Korea; Nokia® of Espoo, Finland; LG® of Seoul, Korea; Motorola® of Schaumburg, Ill.; and Apple® Computer of Cupertino, Calif. A mobile device can include, for example, a display, a processor, a power source (e.g., a battery), a data store, a speaker, memory, a buffer.

Device 100 may also include application 130, memory 140, and data structure 150. Application 130 may carry out various functional aspects and might take on a variety of forms. For example, application 130 might include configuration settings, might facilitate communicating data between multiple devices, might handle updates, include user settings, etc. Specifically, application 130 may be used to generate a voice characteristic profile stored on mobile device 100.

Memory 140 may include a data structure 150 that stores and facilitates the operation of application 130. For example, memory 150 may store data relating to a characteristic of a voice characteristic profile, as well as information related to prioritization of voice profile characteristics. In addition, memory 140 may store firmware and other various software modules and components that might be present in mobile device 100. These modules and components may be used in embodiments of the present invention to analyze information communicated during a call involving mobile device 100. Other examples of illustrative software include things such as the operating system of a phone, third-party applications such as data analysis, location-based services, contact information, and the like. In sum, FIG. 1 is not meant to indicate all systems or components of mobile device 100. An overview of mobile device 100 is presented and certain components are listed so as to be able to refer to them throughout this disclosure.

Figure 2:
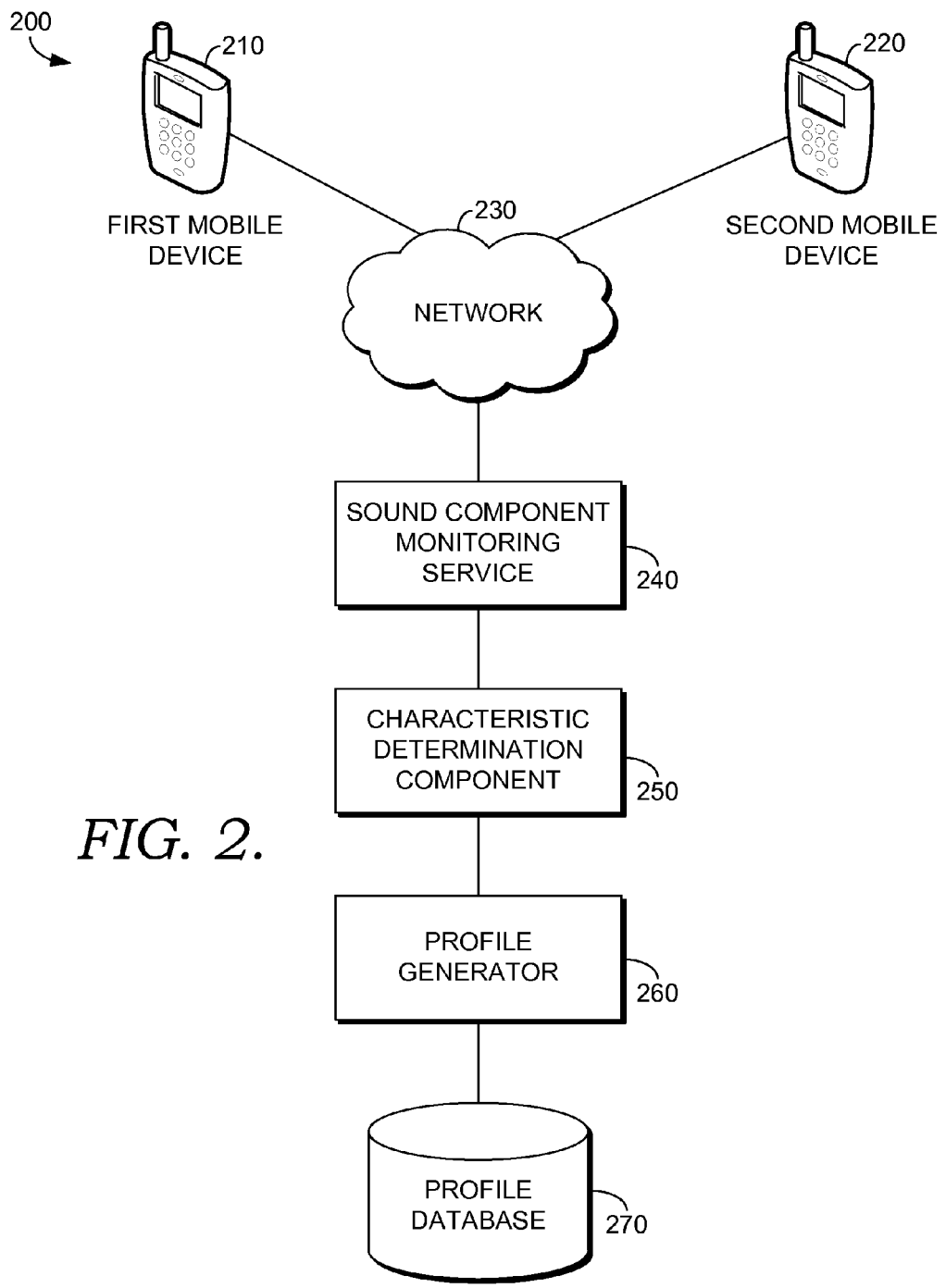
FIG. 2 is a block diagram illustrating a computing system for generating voice characteristic profiles, in accordance with an embodiment of the present invention.

Turning now to FIG. 2, a block diagram illustrating a computing system 200 for generating voice characteristic profiles is provided, in accordance with an embodiment of the present invention. As shown in FIG. 2, computing system 200 includes a first mobile device 210, a second mobile device 220, a network 230, a sound component monitoring service 240, a characteristic determination service 250, a profile generator 260, and a profile database 270.

The first mobile device 210 and second mobile device 220 can communicate by way of network 230. Network 230 could be wired, wireless, or both. Additionally, network 230 can be a single network or can include multiple networks, as well as being a network of networks, but is shown in more simple form so as to not obscure other aspects of the present invention. For example, network 230 may include one or more wide area networks (WANs), one or more local area networks (LANs), one or more public networks, such as the Internet, and/or one or more private networks. Network 230 might include an array of devices, which are not shown so as to not obscure more relevant aspects of the invention. In a wireless telecommunications network, components such as a base station, a communications tower, or even access points (as well as other components) can provide wireless connectivity. Although single components are illustrated for clarity, one skilled in the art will appreciate that network 230 can enable communication between any number of mobile devices.

A first caller of a mobile device, such as first mobile device 210, may initiate a call with a second caller of another mobile device, such as second mobile device 220. During the call, the information communicated between the first caller and second caller may be analyzed. In particular, one or more sound components may be provided by the first caller to a sound component monitoring service, such as sound component monitoring service 240, to be monitored. The sound component monitoring service 240 is a service that may detect sound components present in information communicated during calls. The sound component monitoring service 240 may be provided sound components from the first caller to monitor in particular conversations. Alternatively, the sound components to be monitored may be determined from a characteristic determination component, such as characteristic determination component 250.

In particular, a characteristic determination component 250 may identify a set of sound components that are particular to a characteristic, such as a language dialect. Once the sound component monitoring service 240 has identified the sound components from the first caller that are detected in the information communicated between the first caller and second caller, the sound component monitoring service 240 may provide the detected sound components to the characteristic determination component 250. The characteristic determination component 250 may assess the sound components the first caller against pre-determined sound components associated with characteristics, such as a language dialect or age of the first caller. Once a threshold number of distinct sound components associated with a first characteristic have been matched at the characteristic determination component 250, the first characteristic may be provided to a profile generator, such as profile generator 260.

At profile generator 260, the first characteristic determined at characteristic determination component 250 may be associated with the first caller. In particular, profile generator 250 may generate a voice characteristic profile that includes characteristics associated with the first caller. As such, the voice characteristic profile of the first caller that is generated at profile generator 250 includes the first characteristic determined at characteristic determination component 240. Further, once the voice characteristic profile of the first caller has been generated, the voice characteristic profile of the first user may be stored at a database, such as database 270. As such, when the first caller initiates communication to be analyzed by a voice recognition system, the voice recognition system may query database 270 to retrieve the voice characteristic profile of the first user.

Figure 3:
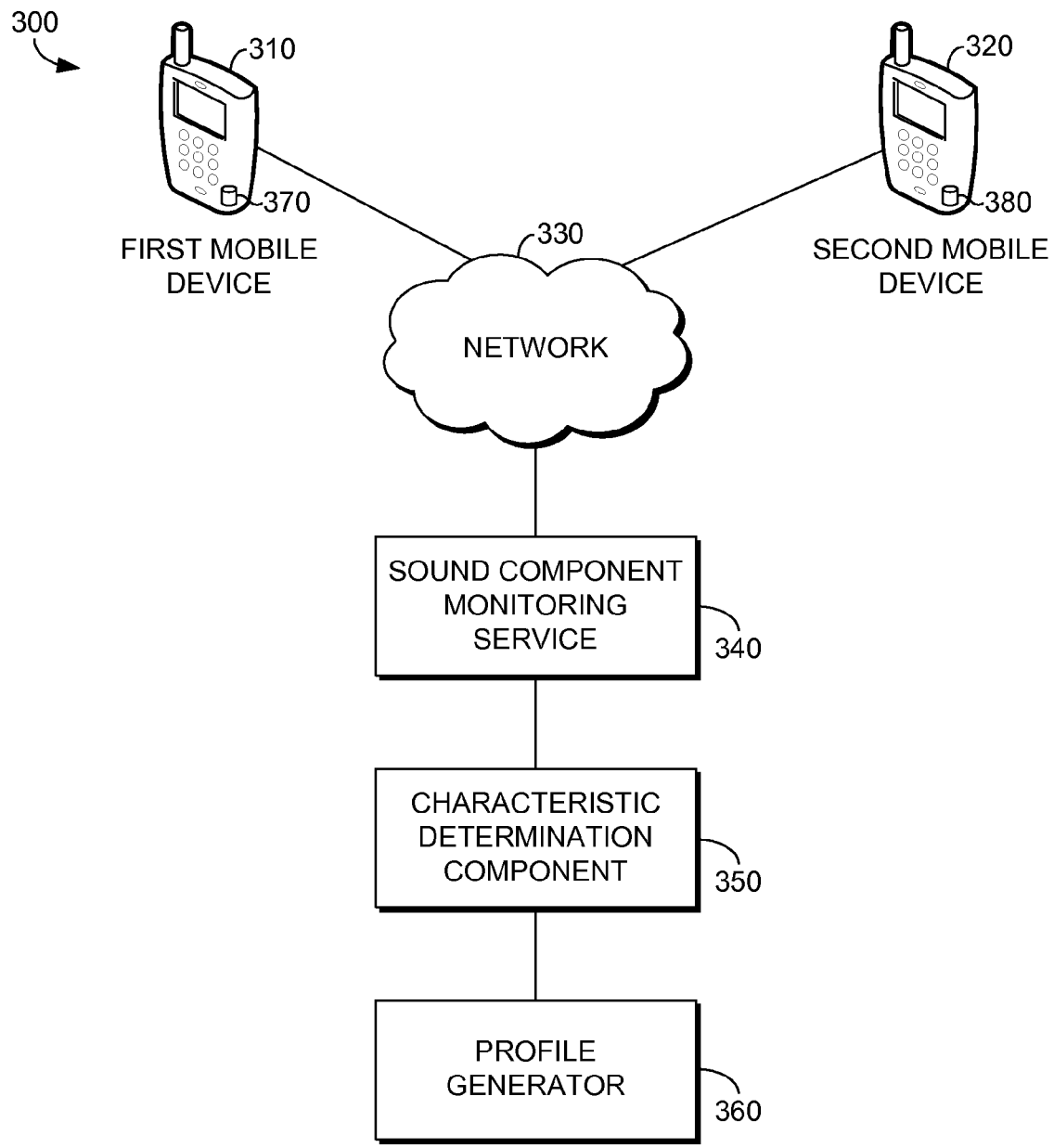
FIG. 3 is another block diagram illustrating a computing system for generating voice characteristic profiles, in accordance with an embodiment of the present invention.

FIG. 3 is another block diagram illustrating a computing system 300 for generating voice characteristic profiles, in accordance with an embodiment of the present invention. Similar to FIG. 2, computing system 300 includes a first mobile device 310, a second mobile device 320, a network 330, a sound component monitoring service 340, a characteristic determination service 350, and a profile generator 360. Also similar to FIG. 2, the first mobile device 310 and second mobile device 320 can communicate by way of network 330. However, FIG. 3 has a profile database 370 at first mobile device 310 and a profile database 380 at second mobile device 320. Accordingly, characteristics of a user's voice characteristic profile may be sent within a request to initiate communication between first mobile device 310 and second mobile device 320.

Figure 4:
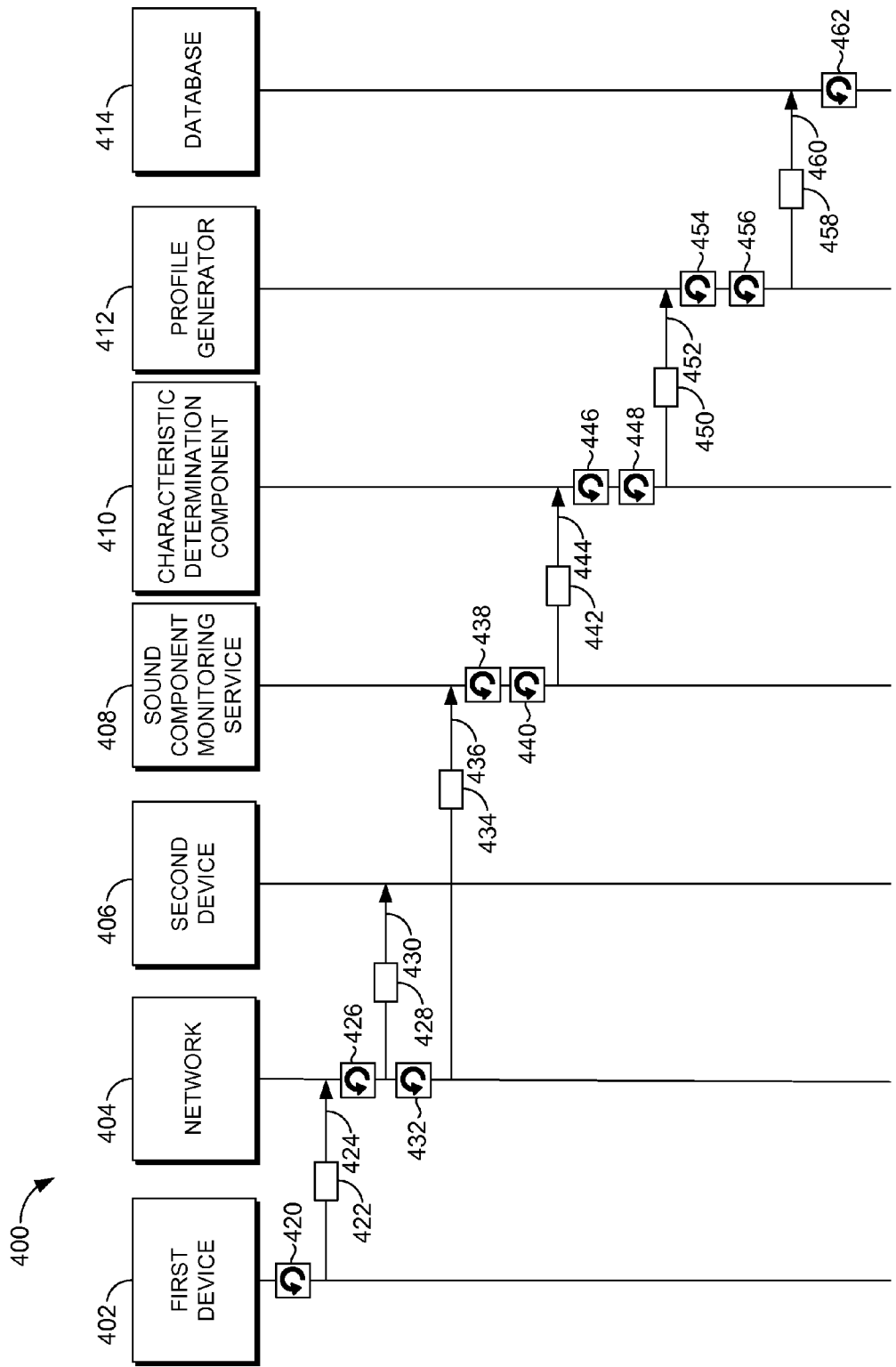
FIG. 4 is a process flow diagram showing an embodiment of a method of generating voice characteristic profiles, in accordance with an embodiment of the present invention.

FIG. 4 is another flow diagram 400 showing an embodiment of a method of generating voice characteristic profiles, in accordance with an embodiment of the present invention. In particular, FIG. 4 provides flow diagram 400 for generating a voice profile in response to determining characteristics of a user based on sound components detected during a call. Initially, a first user of first mobile device 402 generates 420 a call request 422. In particular, the call request 422 includes a request to initiate a call between the first user of the first mobile device 402 and a second user of the second mobile device 406. The call request 422 is transmitted 224 to a network 404. The network 404 initiates 426 a call between the first user of first mobile device 402 and the second user of second mobile device 406. In particular, the network 404 provides 430 a connection 428 to the second mobile device 406 to initiate the call between the first mobile device 402 and the second mobile device 406.

At 432, information 434 communicated in the call is collected and transmitted 436 to a sound component monitoring service 408. The sound component monitoring service 408 monitors 438 the information 434 communicated during the call. Further, still at the sound component monitoring service 408, it is determined 440 that a set of sound components have been communicated during a call. Based on the determination 440, a request 442 is sent 444 to a characteristic determination component 410. In particular, the request 442 is sent 444 to determine whether the set of sound components match a threshold amount of sound components associated with a characteristic. At 446, the characteristic determination component determines that a subset of the set of sound components match a threshold amount of sound components associated with a first language dialect. As such, at 448, the characteristic determination component 410 generates a message 450 to profile generator 412. The message 450 includes the first language dialect determined at the characteristic determination component 410. Further, message 450 is transmitted 452 to profile generator 412.

At profile generator 412, a voice characteristic profile is generated 454. In particular, the voice characteristic profile is generated 454 in association with the first user of first mobile device 402. Further, profile generator 412 generates 456 a message 458 that include the voice characteristic profile. Further, the message 458 is provided 460 to a database 414. In particular, database 414 may store 462 voice characteristic profiles in association with identification information associated with users. As such, database 414 may store the voice characteristic profile of the first user of the first mobile device 402. Additionally, the voice characteristic profile of the first user may include the first language dialect associated with the first user. Accordingly, when the first user associated with first mobile device 402 engages in communication with the second user associated with second mobile device 406, database 414 may be queried to provide the voice characteristic profile of the first user to increase the accuracy of a voice recognition system used to enhance the communication between the first mobile device 402 and the second mobile device 406.

Figure 5:
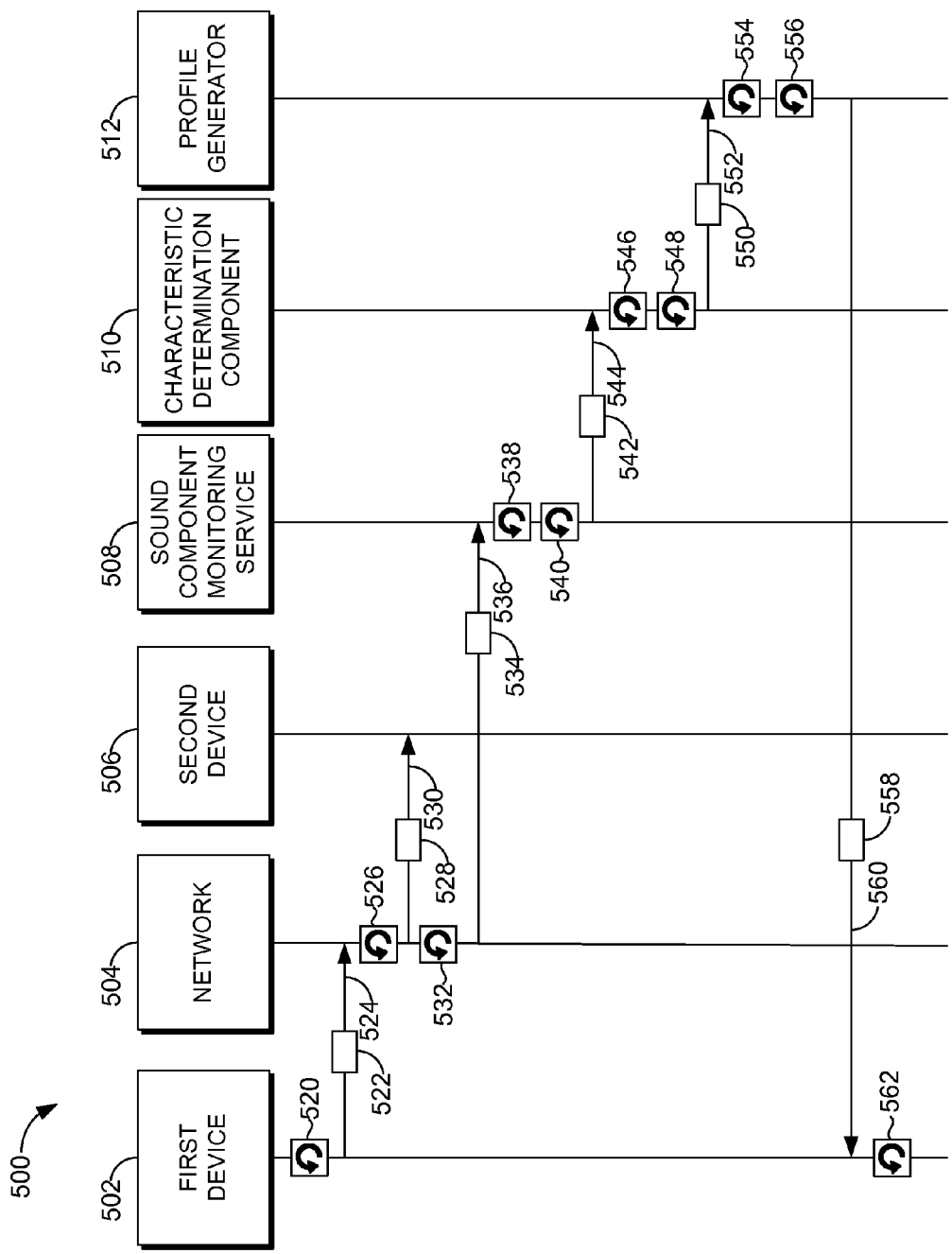
FIG. 5 is another process flow diagram showing an embodiment of a method of generating voice characteristic profiles, in accordance with an embodiment of the present invention.

FIG. 5 is a further flow diagram showing an embodiment of a method of generating voice characteristic profiles, in accordance with an embodiment of the present invention. In particular, FIG. 5 provides flow diagram 500 for generating a voice profile in response to determining characteristics of a user based on sound components detected during a call. As in FIG. 4, a first user of first mobile device 502 initially generates 520 a call request 522. In particular, the call request 522 includes a request to initiate a call between the first user of the first mobile device 502 and a second user of the second mobile device 506. The call request 522 is transmitted 524 to a network 504. The network 504 initiates 526 a call between the first user of first mobile device 502 and the second user of second mobile device 506. In particular, the network 504 provides 530 a connection 528 to the second mobile device 506 to initiate the call between the first mobile device 502 and the second mobile device 506.

At 532, information 534 communicated in the call is collected and transmitted 536 to a sound component monitoring service 508. The sound component monitoring service 508 monitors 538 the information 534 communicated during the call. Further, still at the sound component monitoring service 508, it is determined 540 that a set of sound components have been communicated during a call. Based on the determination 540, a request 542 is sent 544 to a characteristic determination component 510. In particular, the request 542 is sent 544 to determine whether the set of sound components match a threshold amount of sound components associated with a characteristic. In embodiments, a characteristic may include a language dialect, an age of a user, a gender of a user, a particular interest or hobby of a user, etc.

At 546, the characteristic determination component 510 determines that a subset of the set of sound components match a threshold amount of sound components associated with a first characteristic. In embodiments, the characteristic determination component may query a keyword database, sound component database, or both, based on the determined first characteristic. For example, if the first characteristic indicated the user was a fifty-year-old man, the keyword database may have a set of words that are commonly used by fifty-year-old men, such a political candidates or famous actors, stored in association with that age and gender demographic. In particular, the keyword database may have a set of words that are preferentially associated with the demographic group of fifty-year-old men. For example, words that are common across demographic groups, such as "a," "the," or "I," may not be stored in association with any particular demographic group since the words are universal to demographic groups who speak English. Accordingly, in embodiments, only words that are distinct to a particular demographic group may be stored at the keyword database in association with each particular demographic group.

As such, at 548, the characteristic determination component 510 generates a message 550 to profile generator 512. The message 550 includes the first characteristic determined at the characteristic determination component 510. Additionally, the message 550 may include the words retrieved from a keyword database as described above. Further, message 550 is transmitted 552 to profile generator 512.

At profile generator 512, a voice characteristic profile is generated 554. In particular, the voice characteristic profile is generated 554 in association with the first user of first mobile device 502. Further, profile generator 512 generates 556 a message 558 that includes the voice characteristic profile associated with the first user of first mobile device 502. Further, the message 558 is provided 560 to first mobile device 502. In particular, first mobile device 502 may store 562 the voice characteristic profile associated with the first user of first mobile device 502. As such, when the first user associated with first mobile device 502 engages in communication with the second user associated with second mobile device 506, the voice characteristic profile stored at first mobile device 502 may be queried to provide the voice characteristic profile to network 404 in order to increase the accuracy of a voice recognition system used to enhance the communication between the first mobile device 502 and the second mobile device 506.

Figure 6:
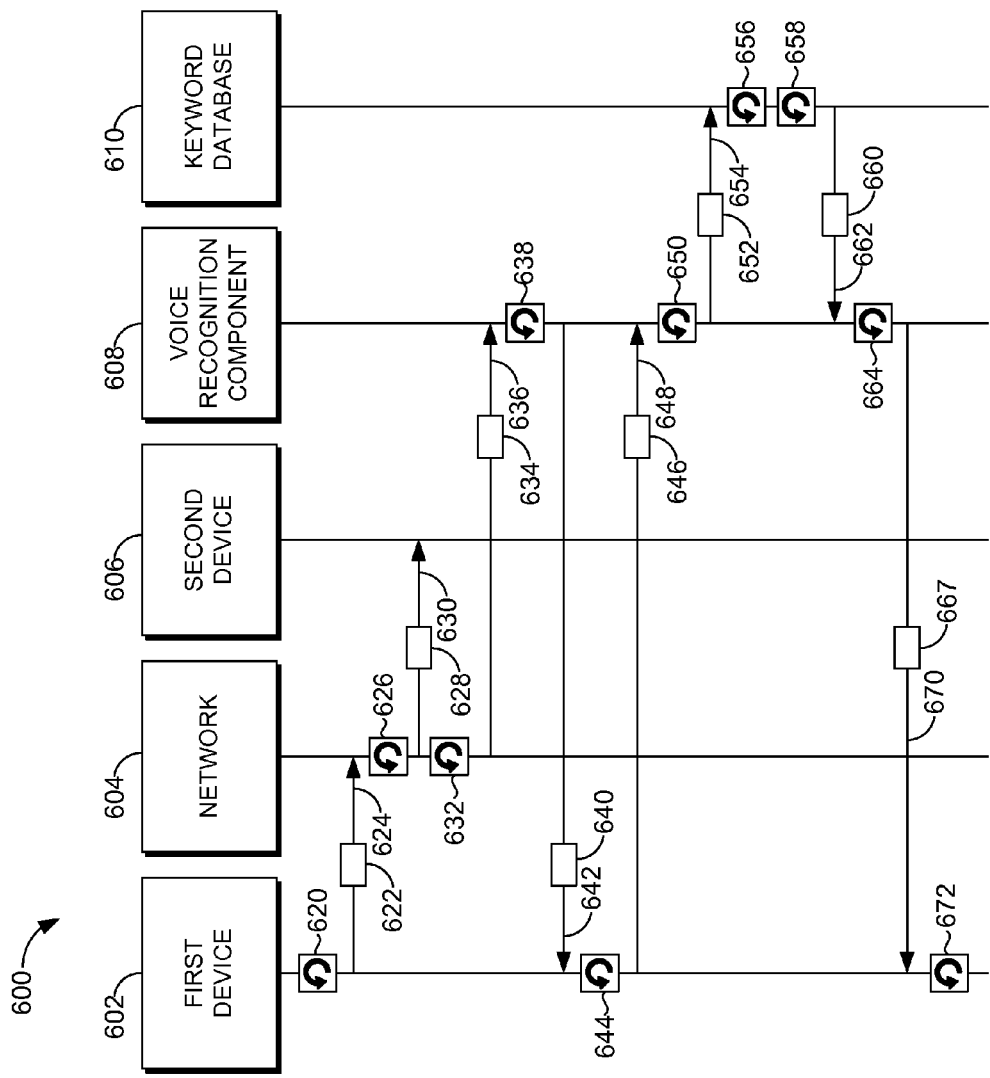
FIG. 6 is a further process flow diagram showing an embodiment of a method of modifying information communicated during a call based on voice characteristic profiles, in accordance with an embodiment of the present invention.

FIG. 6 is a flow diagram showing an embodiment of a method of modifying information communicated during a call based on voice characteristic profiles, in accordance with an embodiment of the present invention. As in FIGS. 4 and 5, a first user of first mobile device 602 initially generates 620 a call request 622. In particular, the call request 622 includes a request to initiate a call between the first user of the first mobile device 602 and a second user of the second mobile device 606. The call request 622 is transmitted 624 to a network 604. The network 604 initiates 626 a call between the first user of first mobile device 602 and the second user of second mobile device 606. In particular, the network 604 provides 630 a connection 628 to the second mobile device 606 to initiate the call between the first mobile device 602 and the second mobile device 606.

At 632, information 634 communicated in the call is collected and transmitted 636 to a voice recognition component 608. Voice recognition component 608 may include a voice recognition system. In response to receiving 638 the information 634, voice recognition component 608 generates 638 a message 640 that is transmitted 642 to first mobile device 602. In particular, the message 640 includes a request for a characteristic from a voice characteristic profile associated with a first caller associated with first mobile device 602. At 644, first mobile device 602 generates 644 a response 646. The response 646 includes a characteristic associated with the first caller. Further, the response 646 is transmitted 648 to the voice recognition component 608.

In response to receiving 650 the response 646, the voice recognition component 608 analyzes 650 the information 634 communicated during the call. In particular, the voice recognition component 608 analyzes 650 the information 634 communicated during the call in light of the response 646 received from first mobile device 602. Further, at 650, voice recognition component 608 generates a query 652 to identify a set of words associated with the characteristic received 650 at the voice recognition component 608. The query 652 is then sent 654 to keyword database 610. At 656, a set of keywords associated with the characteristic are identified. Additionally, at 658, keyword database 610 generates a message 660 to voice recognition component 608. In particular, message 660 includes the set of keywords associated with the characteristic. The message 660 is transmitted 662 to voice recognition component 602.

In response to receiving 664 the message 660, voice recognition component 608 modifies 664 the information 634 communicated during the call. Additionally, voice recognition component generates 667 a message 670. Message 670 comprises the information modified at voice recognition component 608. Additionally, message 670 is transmitted 672 to first mobile device 602.

Figure 7:
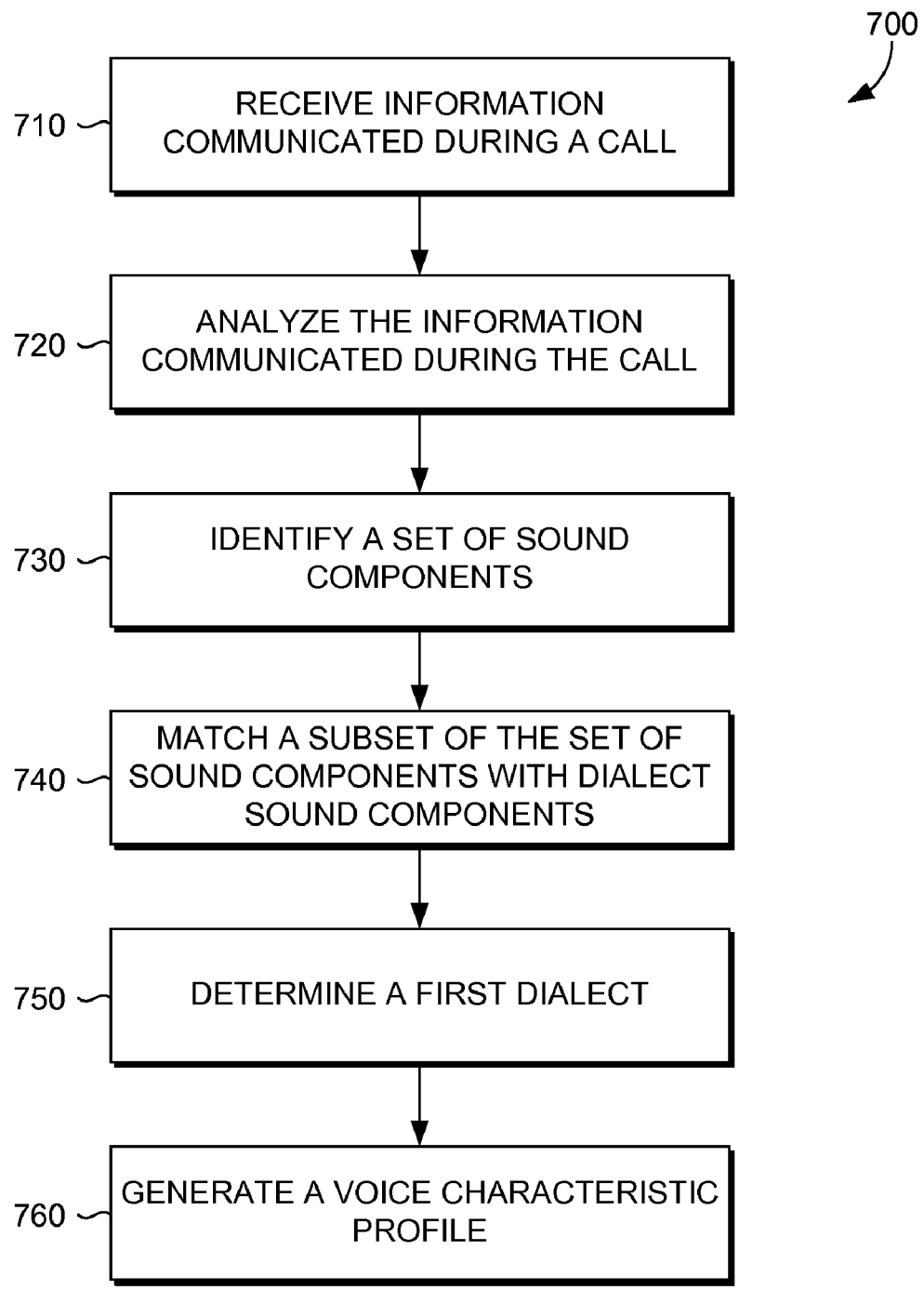
FIG. 7 is a flow diagram showing an embodiment of a method of generating voice characteristic profiles, in accordance with an embodiment of the present invention.

FIG. 7 is a flow diagram 700 showing an embodiment of a method of generating voice characteristic profiles, in accordance with an embodiment of the present invention. At block 710, information communicated during a call is received. At block 720, the information communicated during the call is analyzed. At block 730, a set of sound components is identified. In particular, the set of sound components are identified from the information communicated by a first caller during the call. Additionally, identifying the set of the set of sound components is based on analyzing the information communicated during the call. At block 740, a subset of the set of sound components is matched with pre-defined dialect sound components. Dialect sound components are sound components that are associated with a dialect. In particular, the subset of the set of sound components matches a threshold number of pre-defined dialect sound components. At block 750, a first dialect is determined. The first dialect is determined based on matching the subset of the set of sound components with the threshold number of pre-defined dialect sound components associated with the first dialect. At block 760, a voice characteristic profile is generated. In particular, a voice characteristic profile of the first caller is generated. Further, the voice characteristic profile includes the first dialect.

Figure 8:
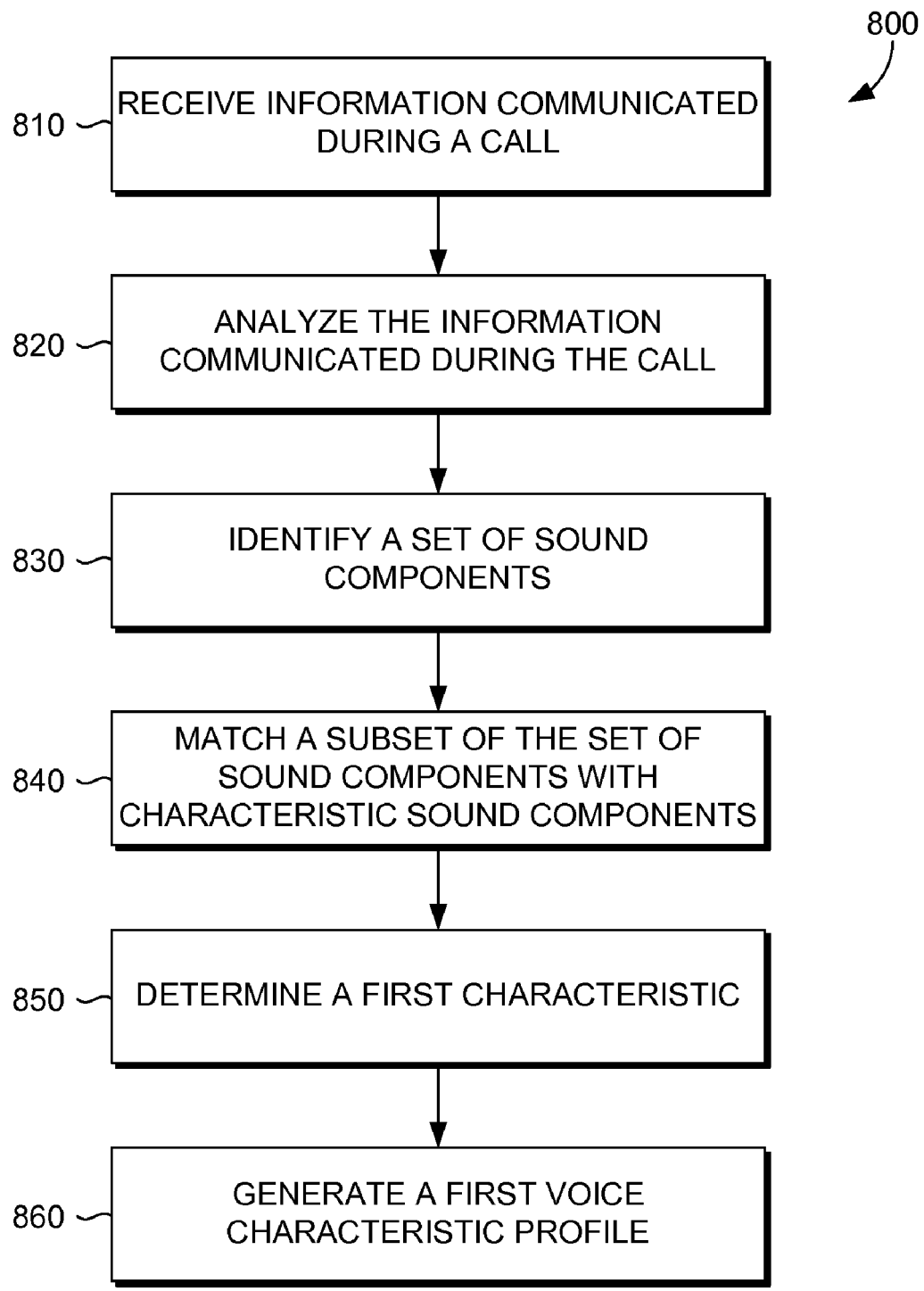
FIG. 8 is a flow diagram showing an embodiment of a method of generating voice characteristic profiles of callers, in accordance with an embodiment of the present invention.

FIG. 8 is a flow diagram 800 showing an embodiment of a method of generating a voice characteristic profile associated with a caller, in accordance with an embodiment of the present invention. At block 810, information communicated between a first caller and a second caller during a call is received. In particular, the information is received at a computing device. At block 820, the information communicated during the call is analyzed. Further, at block 830, a set of sound components that originate from the first caller are identified. In embodiments, the set of sound components may be identified based on the analyzing of the information communicated during the call.

At block 840, a subset of the set of sound components are matched with pre-defined sound components. In particular, the pre-defined sound components may be associated with a characteristic. Further, sound components may be provided from a first user, may be provided by a characteristic recognition component, or a combination of both. Additionally, at block 850, the set of sound components may be determined to match the pre-defined sound components when a threshold number of the sound components match. In further embodiments, the set of sound components may meet or exceed a threshold number of sound components associated with more than one characteristic. For instance, a set of sound components associated with the first caller may exceed a threshold of sound components associated with a German dialect and an American dialect. Additionally, at block 860, a first characteristic is determined. In particular, the first characteristic may be determined based on matching the subset of the set of sound components with the pre-defined sound components. Further, if more than one characteristic is determined, one of the characteristic may be prioritized over the other(s) determined characteristic(s). At block 870, a first voice characteristic profile is generated. In particular, a first voice characteristic profile that is associated with the first caller is generated. Further, the first voice characteristic profile may include the first characteristic.

Figure 9:
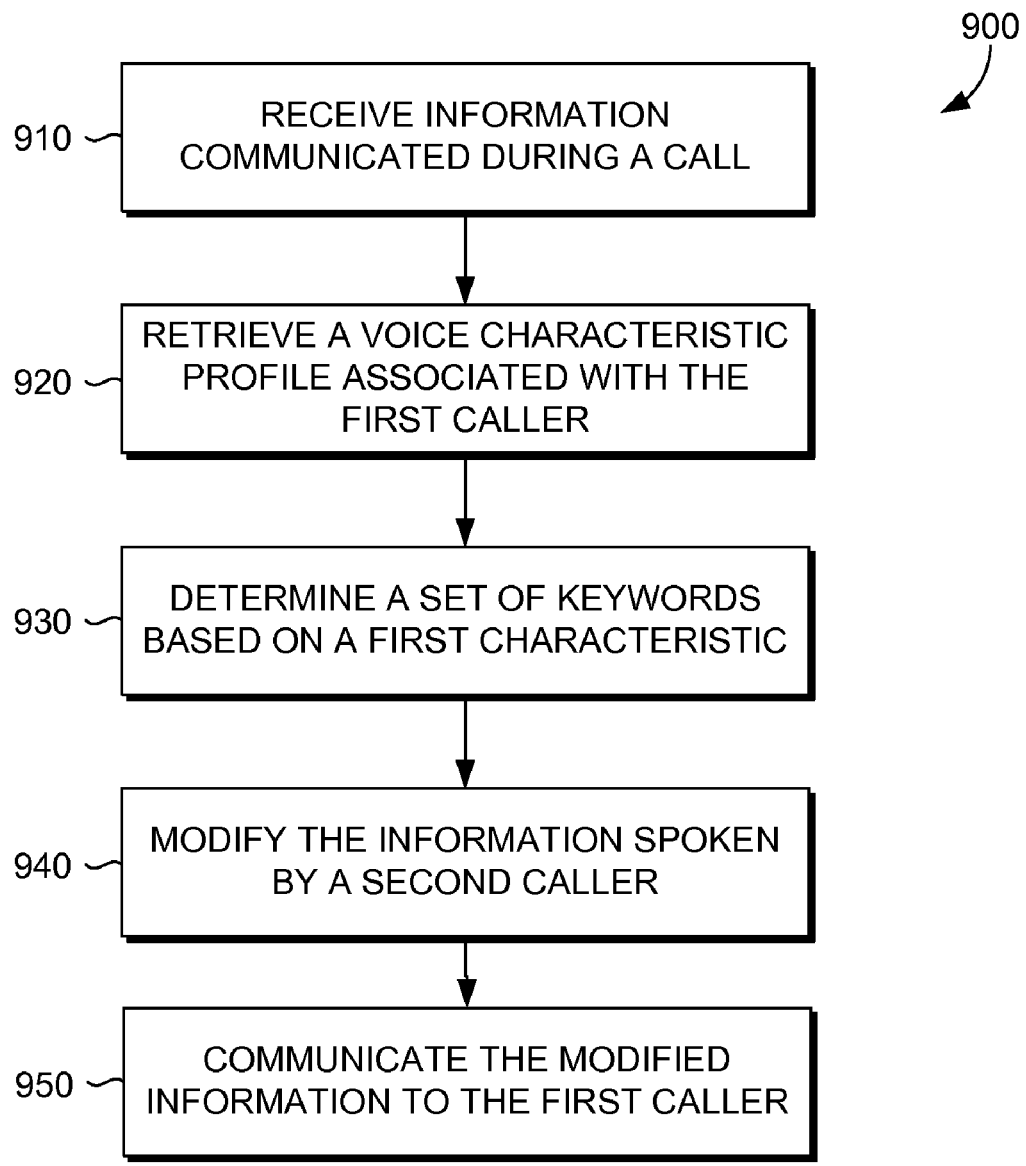
FIG. 9 is a flow diagram showing an embodiment of a method of modifying information communicated during a call based on voice characteristic profiles, in accordance with an embodiment of the present invention.

FIG. 9 is a flow diagram 900 showing an embodiment of a method of modifying information communicated during a call based on voice characteristic profiles, in accordance with embodiments of the present invention. At block 910, information is communicated during a call between a first caller and a second caller. The information spoken by the second caller is received at a voice processing component, such as a voice processing component on a computing device. At block 920, a voice characteristic profile associated with the first caller is retrieved. The voice characteristic profile may be retrieved from a database. Further, the voice characteristic profile may include a first characteristic.

At block 930, a set of keywords associated with the first characteristic is determined. The set of keywords may be queried from a keyword database. Further, at block 940, the information spoken by the second caller is modified based on the first characteristic and the set of keywords. The first characteristic may be a language dialect. Additionally, the set of keywords may include a set of terms associated with the language dialect of the first characteristic. As such, modifying the information may include changing the information spoken by the second caller to match the language dialect. In particular, terms spoken by the second caller that are absent from the language dialect may be translated into the closest similar term present in the language dialect. For example, if information spoken by the second caller is being modified to match an American English dialect, the British/French term "courgette" may be translated to the word "zucchini." Alternatively, the first characteristic may be an age-based characteristic. As such, modifying the information may include translating words from the second caller that are absent from the first caller's vocabulary to match the first caller's age demographic. Further, at block 940, the modified information is communicated to the first caller. In embodiments, the first caller may affirm or deny the accuracy of portions of the modified information. In particular, the first caller may affirm the accuracy of portions of the modified information by inputting an indication that the modified information has been correct. Further, the first caller may deny the accuracy of portions of the modified information by inputting an indication that the modified information has contained an error or errors. Additionally, the first caller may input corrections to the modified information as needed.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media having computer-executable instructions embodied thereon that, when executed by one or more computing devices, cause the one or more computing devices to perform a method of generating and using voice characteristic profiles, the method comprising:

receiving information communicated by a first caller during a phone conversation between the first caller and a second caller via a first caller's device and a second caller's device;

analyzing the information communicated by the first caller;

identifying a set of sound components from the information communicated by the first caller;

matching a subset of the set of sound components with a threshold number of sound components associated with at least one voice characteristic;

determining a first voice characteristic based on matching the subset of the set of sound components with the threshold number of sound components associated with the first voice characteristic;

generating a voice characteristic profile of the first caller, the voice characteristic profile comprising the first voice characteristic; and using the voice characteristic profile of the first caller to modify information communicated by the second caller to match the first voice characteristic associated with the first caller to enhance a communication between the first caller's device and the second caller's device.

2. The computer-readable media of claim 1, further comprising:

determining a second voice characteristic based on matching the subset of the set of sound components with a threshold number of sound components associated with the second voice characteristic.

3. The computer-readable media of claim 2, wherein the first voice characteristic is a primary dialect and the second voice characteristic is a secondary dialect.

4. The computer-readable media of claim 3, wherein an interpretation of a word consistent with both the primary and secondary dialects is used when a conflict exists with a generic dialect.

5. The computer-readable media of claim 3, wherein an interpretation of a word consistent with the primary dialect is used when a conflict exists with a secondary dialect.

6. A method of generating and using a voice characteristic profile associated with a first caller, comprising:

receiving, at a computing device, information communicated during a phone conversation between a first caller and a second caller via a first caller's device and a second caller's device;

analyzing information communicated by the first caller;

identifying a set of sound components that originate from the first caller;

matching a subset of the set of sound components with pre-defined sound components associated with a characteristic;

determining a first characteristic based on matching the subset of the set of sound components with the pre-defined sound components;

generating a first voice characteristic profile that is associated with the first caller, the first voice characteristic profile comprising the first characteristic; and using the first voice characteristic profile associated with the first caller to modify information communicated by the second caller to match the first voice characteristic associated with the first caller to enhance a communication between the first caller's device and the second caller's device.

7. The method of claim 6, wherein the sound components are provided by the first caller.

8. The method of claim 6, wherein the sound components are provided by a characteristic recognition component.

9. The method of claim 6, wherein matching a subset of the set of sound components with pre-defined sound components associated with a characteristic comprises matching a threshold number of pre-defined sound components associated with the characteristic.

10. The method of claim 9, wherein the subset of the set of sound components match a threshold number of pre-defined sound components associated with a plurality of characteristics.

11. The method of claim 10, wherein the first characteristic of the plurality of characteristics is prioritized above the remaining characteristics of the plurality of characteristics.

12. The method of claim 11, wherein the first characteristic is prioritized based on the subset of the set of sound components matching the greatest number of pre-defined sound components associated with the first characteristic.

* * * * *